(12) United States Patent
Park et al.

(10) Patent No.: US 8,610,735 B2
(45) Date of Patent: Dec. 17, 2013

(54) IMAGE CONVERTING DEVICE AND THREE DIMENSIONAL IMAGE DISPLAY DEVICE INCLUDING THE SAME

(75) Inventors: Mun-San Park, Hwaseong-si (KR); Cheol-Woo Park, Suwon-si (KR); Ung-Gyu Min, Namyangju (KR)

(73) Assignee: Samsung Display Co., Ltd. (KR)

( * ) Notice: Subject to any disclaimer, the term of this patent is extended or adjusted under 35 U.S.C. 154(b) by 536 days.

(21) Appl. No.: 12/913,265

(22) Filed: Oct. 27, 2010

(65) Prior Publication Data

US 2011/0248988 A1 Oct. 13, 2011

(30) Foreign Application Priority Data

Apr. 12, 2010 (KR) .................... 10-2010-0033265

(51) Int. Cl.
*G09G 5/00* (2006.01)
*G09G 5/02* (2006.01)
*H04N 13/04* (2006.01)
*H04N 11/00* (2006.01)
*H04N 5/14* (2006.01)
*G03F 3/08* (2006.01)
*H04N 1/46* (2006.01)
*G06K 9/00* (2006.01)
*G06K 9/36* (2006.01)
*G06K 9/40* (2006.01)

(52) U.S. Cl.
USPC ........... 345/581; 345/428; 345/606; 345/618; 345/660; 345/690; 348/51; 348/552; 348/672; 358/522; 358/525; 358/448; 382/168; 382/232; 382/260; 382/276; 382/285

(58) Field of Classification Search
CPC ........................... G06K 9/4671; G06T 3/0012
USPC ......... 345/418–422, 428, 581, 589, 600, 606, 345/618–619, 630, 690, 660, 670–672, 345/472–472.2; 348/42, 51, 253–254, 348/552–553, 557, 560, 571, 584, 598, 348/627–630, 671–672; 358/1.9, 57–540, 358/448; 382/168–169, 190, 232, 254, 260, 382/276, 284–285, 298–300
See application file for complete search history.

(56) References Cited

U.S. PATENT DOCUMENTS

2010/0246954 A1* 9/2010 Kim et al. .................... 382/170

FOREIGN PATENT DOCUMENTS

| JP | 09243960 | 9/1997 |
|---|---|---|
| JP | 2000172201 | 6/2000 |
| KR | 100251016 | 1/2000 |

(Continued)

OTHER PUBLICATIONS

Hans-Christoph Nothdurft; "Salience from feature contrast: additivity across dimensions"; Vision Research; vol. 40; 2000; pp. 1183-1201.

(Continued)

*Primary Examiner* — Wesner Sajous
(74) *Attorney, Agent, or Firm* — Cantor Colburn LLP (57) ABSTRACT

An image converting device includes; a downscaling unit which downscales a two-dimensional image to generate at least one downscaling image, a feature map generating unit which extracts feature information from the downscaling image to generate a feature map, a visual attention calculating unit which generates a low-level attention map based on a visual attention of the feature map, and an image expansion unit which up-scales the low-level attention map, wherein an increasing gray value may be added to image data disposed on the upper portion in the low-level attention map, and 0 or a decreasing gray value may be added to the image data disposed on the lower portion.

20 Claims, 9 Drawing Sheets

(56) References Cited

FOREIGN PATENT DOCUMENTS

KR   1020090004265   1/2009

OTHER PUBLICATIONS

Criminisi et al.; "Single View Metrology"; IJCV; vol. 40; 2000; pp. 1-27.

Santella et al.; "Gaze-Based Interaction for Semi-Automatic Photo Cropping"; CHI; 2006; pp. 771-780.

Chen et al.; "A visual attention model for adapting images on small displays"; Multimedia Systems; 2003.

Zhang et al.; "Shape from Shading: A Survey"; IEEE PAMI, vol. 21, 1999, pp. 1-41.

\* cited by examiner

IMAGE CONVERTING DEVICE AND THREE DIMENSIONAL IMAGE DISPLAY DEVICE INCLUDING THE SAME

This application claims priority to Korean Patent Application No. 10-2010-0033265, filed on Apr. 12, 2010, and all the benefits accruing therefrom under 35 U.S.C. §119, the content of which in its entirety is herein incorporated by reference.

BACKGROUND OF THE INVENTION (a) Field of the Invention

An image converting device and three dimensional ("3D") image display device including the same are provided.

(b) Description of the Related Art

Generally, in the 3D image displaying technology, a stereoscopic effect of an object is represented using binocular parallax. Binocular parallax is one of the most critical factors that allow a person to perceive a stereoscopic effect at close range. That is, different 2D images are respectively seen by a right eye and a left eye of an observer, and if the image seen by the left eye (hereinafter referred to as a "left-eye image") and the image seen by the right eye (hereinafter referred to as a "right-eye image") are transmitted to the brain, the left-eye image and the right-eye image are combined in the brain such that a 3D image having depth information is recognized, i.e., perceived as depth.

The stereoscopic image display device using binocular parallax in 3D image displays may be categorized into different types, including stereoscopic schemes using glasses such as shutter glasses and polarized glasses, and autostereoscopic schemes in which a lenticular lens or a parallax barrier is disposed to the display device without the use of glasses.

Generally, a multi-view 2D image is required to produce the 3D image; that is, two different 2D images taken from different points of view are used in order to produce a 3D image. However these schemes may not utilize a single-view 2D image that has been manufactured in the past in order to generate a 3D image; that is, the above schemes may not generate a 3D image using a 2D image taken from only a single point of view. Thus, movies or images which have been previously filmed in only 2D may not easily be converted to 3D because the second point of view to create binocular parallax is omitted.

Accordingly, research on converting a 2D image into a 3D image to apply content that has been manufactured in the past from a single view point to a next generation display device which may utilize 3D display has been actively undertaken. To convert the 2D image into the 3D image, depth information is generated, parallax is generated, and the left-eye image and the right-eye image are generated, however it is difficult to technically generate the depth information.

BRIEF SUMMARY OF THE INVENTION

An exemplary embodiment of an image converting device according to the present invention includes; a downscaling unit which downscales a two-dimensional ("2D") image to generate at least one downscaling image, a feature map generating unit which extracts feature information from the downscaling image to generate a feature map, a visual attention calculating unit which generates a low-level attention map based on visual attention of the feature map, and an image expansion unit which up-scales the low-level attention map, wherein an increasing gray value may be added to the image data disposed on an upper portion of the low-level attention map, and 0 or a decreasing gray value may be added to the image data disposed on a lower portion of the low-level attention map.

In one exemplary embodiment, a plurality of low-level attention maps may be generated, an image combination unit which combines the plurality of low-level attention maps may be further included in the image converting device, and a visual attention map may be generated from the combined plurality of low-level attention maps.

In one exemplary embodiment, the image converting device may further include an image filtering unit which filters the plurality of combined low-level attention maps.

In one exemplary embodiment, the feature map may include a center area and a surrounding area, and the visual attention may be determined based on a difference between a histogram of the center area and a histogram of the surrounding area.

In one exemplary embodiment, the feature map may include a center area and a surrounding area, the surrounding area and the center area may include at least one unit-block, respectively, and the visual attention may be determined based on a moment for luminance values of a plurality of pixels included in the unit-block.

In one exemplary embodiment, the image expansion unit may expand the combined plurality of low-level attention maps.

In one exemplary embodiment, the image converting device may further include an image filtering unit which filters the low-level attention map.

In one exemplary embodiment, the downscaling image may be an image wherein the 2D image is downscaled in a horizontal direction, in a vertical direction, or in both a horizontal and vertical direction.

A plurality of downscaling images may exist, and the plurality of downscaling images may be processed in one frame.

In one exemplary embodiment, the image converting device may further include a parallax information generating unit which generates parallax information based on the visual attention map and the 2D image.

In one exemplary embodiment, the image converting device may further include a three-dimensional ("3D") image rendering unit which renders the 3D image based on the parallax information and the 2D image.

An exemplary embodiment of an image converting method according to the present invention includes; downscaling a 2D image to generate at least one downscaling image, extracting feature information from the downscaling image to generate a feature map, generating a low-level attention map based on the visual attention of the feature map, and up-scaling the low-level attention map, wherein an increasing gray value is added to the image data disposed on the upper portion of the low-level attention map, and 0 or a gradually decreasing gray value is added to the image data disposed on a lower portion of the low-level attention map.

In one exemplary embodiment, a plurality of low-level attention maps may be generated, the method may further include combining the plurality of low-level attention maps, and the visual attention map may be generated from the combined plurality of low-level attention maps.

In one exemplary embodiment, the image converting method may further include filtering the combined plurality of low-level attention maps.

In one exemplary embodiment, the image converting method may further include generating parallax information based the visual attention map and the 2D image.

In one exemplary embodiment, the image converting method may further include rendering a 3D image based on the parallax information and the 2D image.

An exemplary embodiment of a 3D image display device according to the present invention includes a display panel including a plurality of pixels, and an image converting device converting a 2D image into a 3D image, wherein the image converting device is significantly similar to that described above.

In the exemplary embodiments according to the present invention, the quality of the image having the depth information may be improved, and the data calculating amount may be reduced and memory resources may be saved.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Now, an exemplary embodiment of a three-dimensional ("3D") image display device according to the present invention will be described with reference to FIG. 1 to FIG. 9.

Here, the 3D image display device may include a stereoscopic image display device using shutter glasses or polarization glasses, and an autostereoscopic image display device using a lenticular lens or a parallax barrier. Exemplary embodiments of the stereoscopic image display device includes a display panel including a plurality of pixels.

Figure 1:
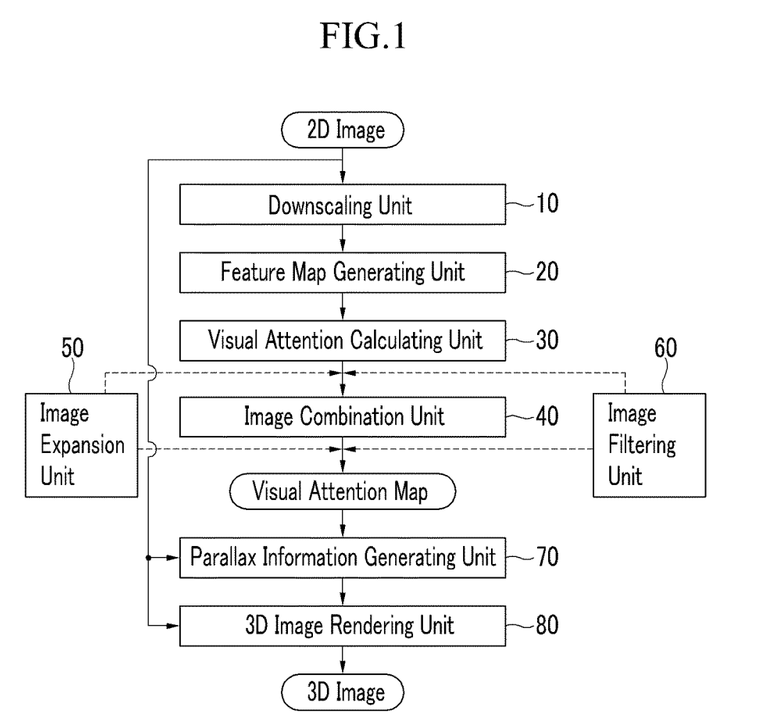
FIG. 1 is a block diagram of an exemplary embodiment of an image converting device according to an the present invention.

FIG. 1 is a block diagram of an exemplary embodiment of an image converting device according to the present invention.

In one exemplary embodiment, the image converting device may be embedded in the 3D image display device. Also, the image converting device may be embedded in various pieces of image receiving and replaying equipment such as a broadcasting tuner, a satellite broadcasting reception terminal, a cable television reception converter, a video cassette recorder ("VCR"), a digital video disk ("DVD") player, a high definition television ("HDTV") receiver, a blue-ray disk player, a game console and various other similar devices.

Referring to FIG. 1, and image converting device may include a downscaling unit 10, a feature map generating unit 20, a visual attention calculating unit 30, an image combination unit 40, an image expansion unit 50, an image filtering unit 60, a parallax information generating unit 70, and a 3D image rendering unit 80. Exemplary embodiments include configurations wherein the image converting device may include a memory or may be connected to an external memory. The image converting device may execute various calculations using the memory as will be described later.

The image converting device converts a two-dimensional ("2D") image into a 3D image. As used herein, the term 2D image means a general 2D image taken from a single view point, and the term 3D image means an image including two 2D images, each taken from a different view point, such as a stereo-view. For example, the 3D image may refer to the left eye image, the right eye image, or both, while the left eye image and the right eye image are images that are displayed on a 2D plane. Embodiments also include configurations wherein the left eye image and the right eye image may be simultaneously output on the 2D plane (and later separated using some form of filter, e.g., a polarization filter or a color filter), and embodiments wherein the left eye image and the right eye image may be sequentially output on the 2D plane.

The 2D image input to the image converting device is converted into a visual attention map having depth information, and the parallax information generating unit 70 generates the parallax information based on the visual attention map and the input 2D image. Here, the parallax information may be generated for a single pixel of the image or for a pixel group including multiple pixels. The 3D image rendering unit 80 renders the 3D image based on the input 2D image and the generated parallax information. For example, the 3D image rendering unit 80 may render the left eye image and the right eye image based on an original 2D image and the generated parallax information.

The term visual attention means that a person's brain and recognition system generally concentrate on a particular region of the image, and this is provided in the various fields. The topic of visual attention has been the subject of much research in the fields of physiology, psychology, neural systems, and computer vision. In addition, visual attention is of particular interest in the field of computer vision related to object recognition, trace, and discovery.

Figure 9:
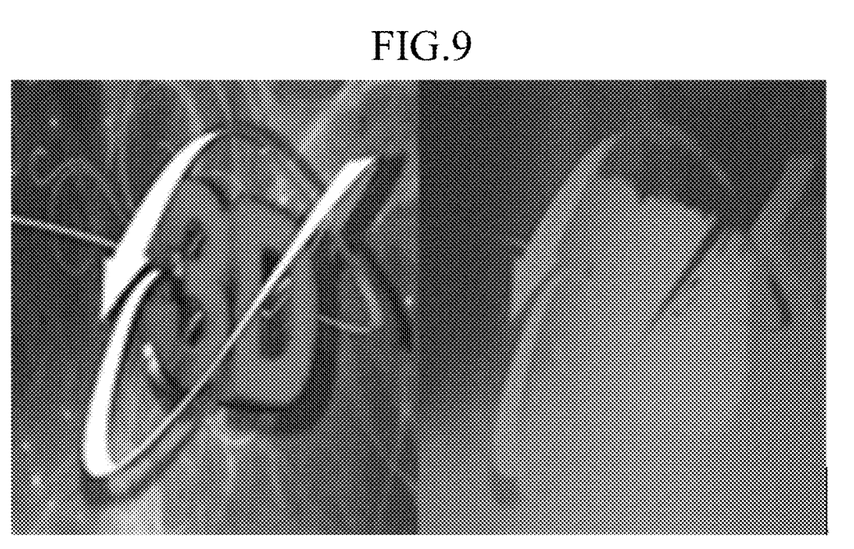
FIG. 9 is a view showing an original image and a visual attention map according to an exemplary embodiment of the present invention.

The visual attention map is an image generated by calculating the visual attention of an observer for the 2D image, and may include information related to the importance of the object in the 2D image. For example, in one exemplary embodiment the visually interesting region may be disposed close to the observer, and the visually non-interesting region may be disposed away from the observer. Referring to FIG. 9, an original 2D image is shown in the left side, and a visual attention map corresponding to the original 2D image is shown in the right side. The visually interesting region is brightly represented (e.g., has a high grayscale) to be disposed close to the observer, and the visually non-interesting region is darkly represented (e.g., has a low grayscale value) to be disposed away from the observer (. In an image that includes an object and a background, the object may be bright and the background may be dark, and accordingly, the object may be seen as protruding from the background. In one exemplary embodiment, the size of the original 2D image and the visual attention map may be 960×1080, respectively.

Next, a process for generating the visual attention map from the 2D image will be described in detail.

Referring to FIG. 1, the downscaling unit 10 generates at least one downscaling image by downscaling the 2D image. For example, the 2D image is downscaled 'm' number of times in a transverse direction and 'n' number of times in a longitudinal direction to generate a rectangular image pyramid, wherein m and n are natural numbers. The downscaling unit 10 may include a transverse downscaling unit and a longitudinal downscaling unit. The transverse downscaling unit downscales the 2D image in the horizontal direction to generate at least one downscaling image, and the longitudinal direction downscaling unit downscales the 2D image in the vertical direction to generate at least one downscaling image.

Figure 3:
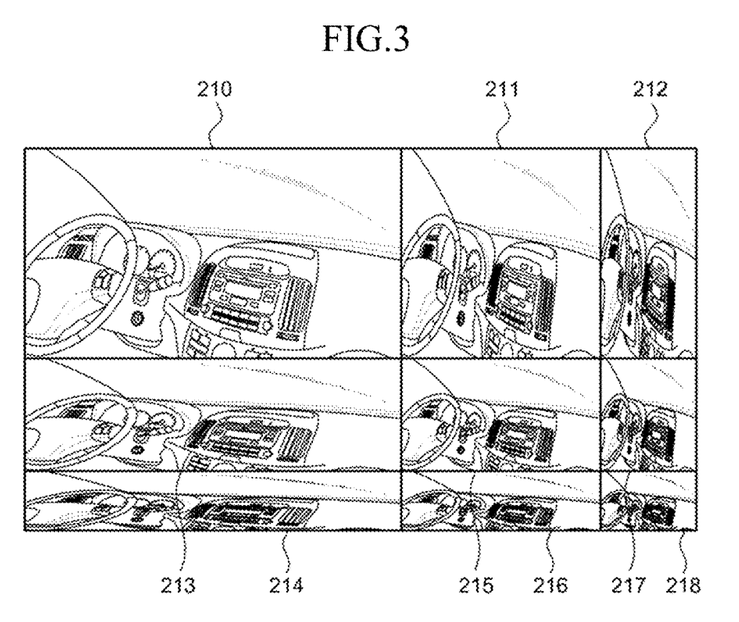
FIG. 3 is a view showing an image processed by an exemplary embodiment of a downscaling unit according to the present invention.

Referring to FIG. 3, the rectangular image pyramid is downscaled in the horizontal direction two times and in the vertical direction two times; that is, as shown in FIG. 3, the original image is illustrated in the upper-left hand corner and successive vertical downscaling (synonymous with compression as used herein) is illustrated in the vertical (downward) direction, while successive horizontal downscaling is illustrated in the horizontal (rightward) direction. That is, the 2D image 210 may be downscaled in the transverse direction two times to generate two downscaling images 213 and 214. Three images 210, 213 and 214 are downscaled in the longitudinal direction two times to generate six downscaling images 211, 212, 215, 216, 217 and 218, respectively. As a result, the rectangular image pyramid including nine images may be generated. For example, the vertical resolution of three images 210, 213 and 214 may respectively be 540, 270 135, and the horizontal resolution of three images 210, 211, and 212 may respectively be 960, 480 and 240. In one exemplary embodiment, several downscaled rectangular images may be processed in one frame such that fast image processing may be possible.

Figure 6:
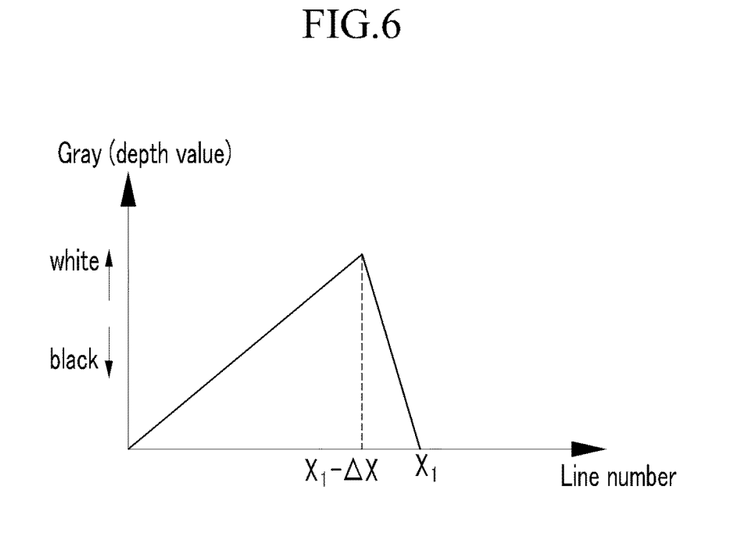
FIG. 6 to FIG. 8 are views showing an exemplary embodiment of an image expansion unit according to the present invention.

Referring to FIG. 1 and FIG. 6, the feature map generating unit 20 extracts the feature information from the 2D image and at least one of downscaling image to generate at least one feature map. Here, the feature information may be a luminance, a color, a texture, a motion, or an orientation. For example, the luminance information may be extracted regarding a single pixel or for an arbitrary pixel group in the rectangular image pyramid to generate the image, and the generated image may be one feature map.

The visual attention calculating unit 30 may execute a low-level attention computation using at least one feature map, and may generate a low-level attention map based on the result of the low-level attention computation. For example, the visual attention calculating unit 30 may use the differences between a histogram of the center area and a histogram of the surrounding area to execute the low-level attention computation.

Figure 2:
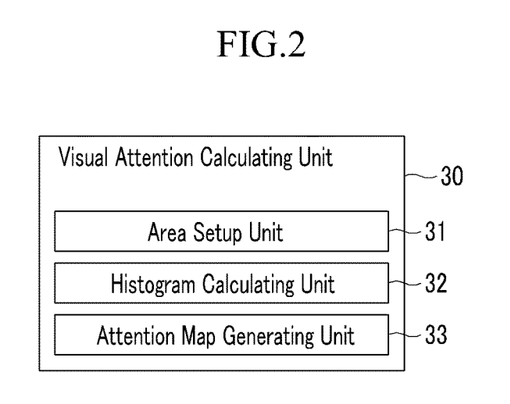
FIG. 2 is a block diagram of an exemplary embodiment of a visual attention calculating unit according to the present invention.

Referring to FIG. 2, an exemplary embodiment of the visual attention calculating unit 30 may include an area setup unit 31, a histogram calculating unit 32, and an attention map generating unit 33.

The area setup unit 31 may determine a center area and a surrounding area for at least one feature map, and the surrounding area may enclose the center area. The present exemplary embodiment of an area setup unit 31 may include a unit block setup unit, a center-area setup unit, and a surrounding-area setup unit.

The unit-block setup unit may determine a unit block size and shape, which in the present exemplary embodiment may include a square or rectangular shaped unit-block. For example, in the present exemplary embodiment the unit-block may have a size of 8 (pixels)×8 (pixels). Here, the number of combinations of the center area and the surrounding area may be geometrically increased according to the size of the 2D image such that the unit-block may be used to reduce the number of combinations of the center area and the surrounding area. Accordingly, the data calculating amount may be reduced.

Figure 4:
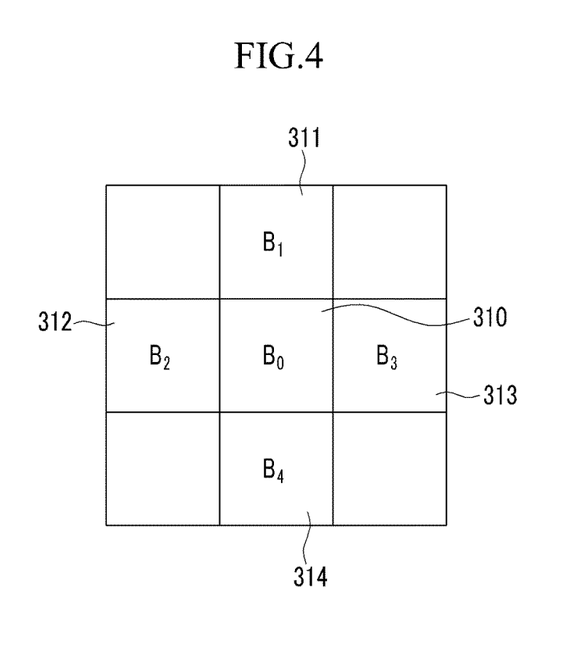
FIG. 4 is a view of a processing method of an exemplary embodiment of an area setup unit according to an the present invention.

The center-area setup unit may determine the center area to be the size of the unit-block, and the surrounding-area setup unit may determine the surrounding area to be the sum of the plurality of unit-blocks. Referring to FIG. 4, the unit-block of the arbitrary size is determined, and the center area and the surrounding area may be made only of the combination of the unit-blocks. For example, the 2D image is downscaled such that the image of various scales may be generated, and the center area may correspond to one unit-block. Here, the surrounding area may be determined to be a 'k' number of neighboring blocks including the block corresponding to the center area, wherein k is a natural number. For example, referring to FIG. 4, the center area is determined to be one B0 block 310, and the surrounding area is determined to be a B1 block 311, a B2 block 312, a B3 block 313, and a B4 block 314. Accordingly, the differences between the histogram of the B0 block 310 and the histogram of the B1 block to B4 block 311, 312, 313, and 314 may be obtained.

The histogram calculating unit 32 may calculate the difference between the feature information histogram of the center area and the feature information histogram of the surrounding area. In the present exemplary embodiment, the histogram may be one of an intensity histogram or a color histogram. Alternative feature information may be alternatively used as described above.

Figure 5:
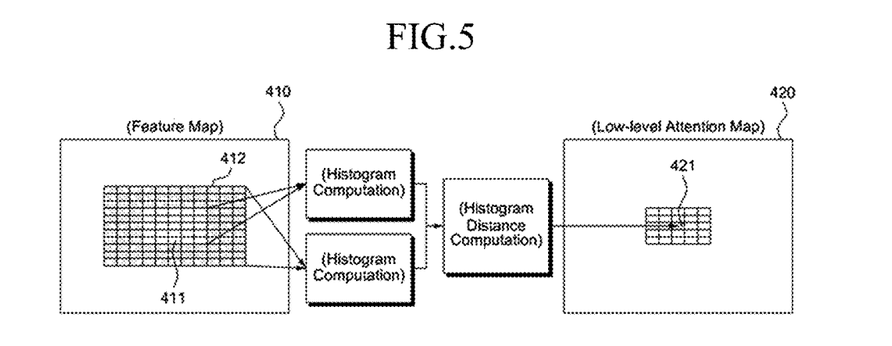
FIG. 5 is a view showing an exemplary embodiment of a low-level attention calculating method according to the present invention.

An exemplary embodiment of a method for calculating the differences of the histograms will be described in detail with reference to FIG. 5.

To use a center-surround histogram, neighboring areas of two types may be defined with respect to the arbitrary pixel of the feature map 410. That is, the center area 411 and the surrounding area 412 may be defined according to the reference pixel. The surrounding area 412 may include the center area 411, and the area of the surrounding area 412 may be larger than the area of the center area 411.

Accordingly, the histograms of the center area and the surrounding area are extracted, and various histogram difference measurement methods may be used to gain the feature value difference 421 of the center area and the surrounding area. Accordingly, the low-level attention map 420 according to the feature value difference 421 of the center area and the surrounding area may be generated.

Various methods to gain the histogram difference may be used. For example, in one exemplary embodiment a chi square ($\chi^2$) method may be used. That is, if the center area is referred to as R and the surrounding area is referred to as Rs, when Ri is referred to as an i-th Bin of the histogram, wherein the histogram may include information regarding the luminance, the color, and the texture of the area, the center-surround histogram is substantially the same as the chi square difference of the center area histogram and the surrounding area histogram, and may be represented by Equation 1 below:

$$\chi^2(R, R_s) = \frac{1}{2} \sum_i \frac{(R^i - R_s^i)^2}{R^i + R_s^i}. \quad <\text{Equation 1}>$$

The attention map generating unit 33 may use the feature information histogram to generate the low-level attention map.

In one exemplary embodiment, the entirety of the center-surround histogram is not used, but instead only a moment of the histogram may be used to execute the low-level attention computation using at least one feature map. As used herein, the term moment may include at least one of a mean, a variance, a standard deviation, and a skew of the histogram. For example, the mean, the variance, the standard deviation, and the skew may be determined for the luminance values of the plurality of pixels included in one unit-block. Memory resources may be saved by using the moment of the histogram, rather than the entire values thereof.

For example, if the value of the j-th pixel of the i-th block is Pij, the moment of the i-th block may be represented by Equation 2 as follows:

$$E_i = \frac{1}{N} \sum_{j=1}^{N} p_{ij}, \; \sigma_i = \left(\frac{1}{N} \sum_{j=1}^{N} (p_{ij} - E_i)^2\right)^{\frac{1}{2}}, \quad <\text{Equation 2}>$$

$$s_i = \left(\frac{1}{N} \sum_{j=1}^{N} (p_{ij} - E_i)^3\right)^{\frac{1}{3}}.$$

Here, $E_i$ refers to the mean, $\sigma_i$ refers to the variance, and $s_i$ refers to the skew.

Also, in this case, a saliency of the predetermined block may be defined by Equation 3 as follows:

$$\sum_{B \in \{B_1, B_2, B_3, B_4\}} MDiff(B_0, B) \quad <\text{Equation 3}>$$

$$MDiff(B_k, B_l) = w_1|E_k - E_l| + w_2|\sigma_k - \sigma_l| + w_3|s_k - s_l|$$

Here, the parameter w is a weight value controlling the relative importance between the moments, and a basic predetermined value may be 1. Also, B0, B1, B2, B3, and B4 may be the blocks shown in FIG. 4.

The low-level attention map generated for at least one downscaling image may be selectively processed by the image filtering unit 60. For example, exemplary embodiments of the filtering method may be a method using a normalization curve, a method using a sigmoid curve, and a method using a bilateral filter. Exemplary embodiments also include configurations wherein two or more methods may be sequentially used. In detail, in the bilateral filter, after executing 10 pixel×10 pixel decimation, 10 pixel×10 pixel interpolation may be executed after using a 5 pixel×5 pixel×5 pixel low pass filter.

Figure 7:
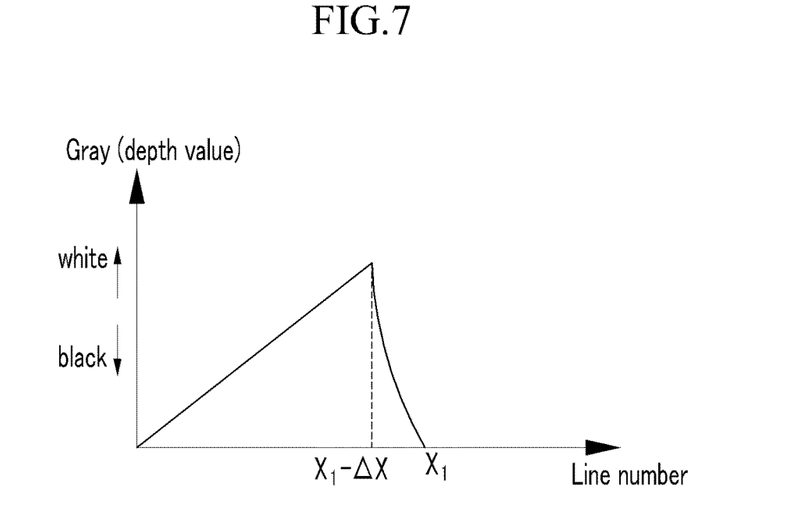
Figure 8:
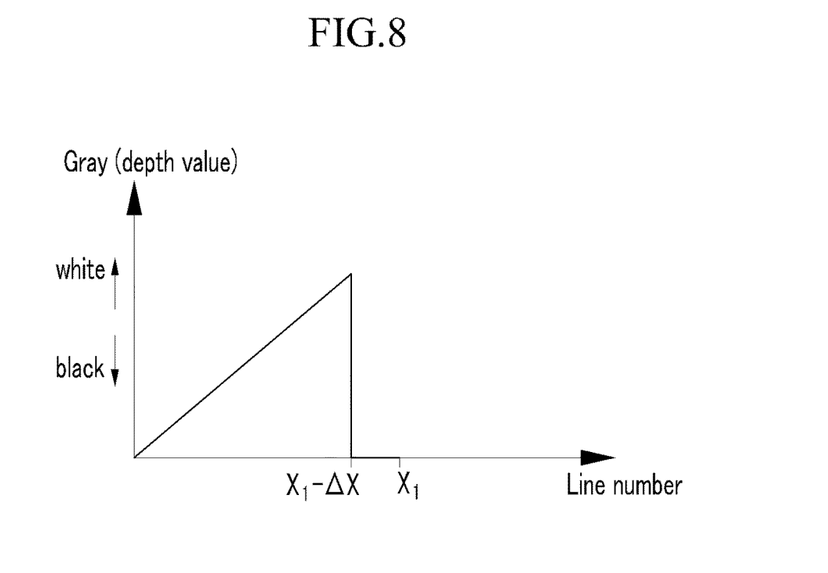

The low-level attention map may be up-scaled by the image expansion unit 50. For example, the up-scaling may use bi-cubic interpolation. Here, in the process of up-scaling the image, the weight value may be added to the image data for each pixel. Here, the image data for each pixel may correspond to the background image. That is, the weight value may not be given to the image data disposed on a lower side in the low-level attention map, or a gradually decreasing weight value may be added to the image data disposed on the lower side of the low-level attention map. For example, as shown in FIG. 6 to FIG. 8, the weight value added in the predetermined area disposed on the lower portion of the low-level attention map is 0 or gradually decreased from the weight value added to an upper area than the predetermined area. Here, the predetermined area represents ΔX multiplied by a horizontal resolution of the image, and ΔX represents the number of predetermined rows in the image. For example, ΔX may be 25. In addition, the shape of the negative slope of the graph may be variously changed. For example, the graph is an inverse-logarithm graph. In FIG. 6 to FIG. 8, X1 is a vertical resolution of the image, i.e., the total number of rows in the image, and for example may be 540, 270, or 135, and "line number" represents a horizontal line number in a column direction of the image. Also, the gray or the depth values may have the value from the black to the white, and for example, the black may be 0 and the white may be 255.

In detail, in an exemplary embodiment wherein the size of the image is 960×540, the weight value added to the image data may be gradually increased as the line number approaches 515 from 0. Next, as the line number approaches 540 from 515, the weight value added to the image data may be gradually decreased from the weight value at the line number 515. When each of two adjacent upper and lower images is weighted in the above described way, an adjacent area of the two images may have dark gray values. Accordingly, although two adjacent images are filtered, each image may have dark gray values at the upper side, and may have gradually brighter gray values in the downward direction to the bottom side from the upper side of each image. Accordingly, the distortion of the gray values in an adjacent area of two images may be prevented, and the image quality may be improved.

Differently from the graphs of FIG. 6 to FIG. 9, if the weight value added to the lower portion of each image is gradually increased, that is, the weight value added to each image continuously increases through the entire line number, when two adjacent images are filtered, the distortion of the gray value occurs because an adjacent area of two weighted images has dark gray values and bright gray values. For example, when the rectangular image pyramid is weighted, the lower portion of the upper image of two adjacent images has bright gray values, and the upper portion of the lower image of two adjacent images has dark gray values. Here, the upper image and the lower image are adjacent to each other in the up and down directions of the rectangular image pyramid. As a result of filtering the weighted rectangular image pyramid, the upper portion of the lower image may have brighter gray values than the expected dark gray values. This is because two adjacent images influence each other particularly in the adjacent area of two images when filtering. In other words, when filtering, the weighted lower portion having bright gray values in the upper image influences the weighted upper portion having dark gray values in the lower image.

The image combination unit 40 combines at least one of the images that are expanded by the image expansion unit 50 and have the same size. For example, at least one of the images may be overlapped with another, and then added.

Next, the combined images may be filtered by the image filtering unit 60. As described above, the image filtering unit 60 may sequentially execute one or more filtering methods.

Also, the combined images may be expanded by the image expansion unit 50. For example, when the size of the combined image is 960×540, the combined image may be changed into the image having the size of 960×1080 by the image expansion unit 50.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An image converting device comprising:
a downscaling unit which downscales a two-dimensional image to generate at least one downscaling image;
a feature map generating unit which extracts feature information from the downscaling image to generate a feature map;
a visual attention calculating unit which generates a low-level attention map based on visual attention of the feature map; and
an image expansion unit which up-scales the low-level attention map,
wherein an increasing gray value is added to image data disposed on an upper portion of the low-level attention map, and 0 or a decreasing gray value is added to image data disposed on a lower portion of the low-level attention map.

2. The image converting device of claim 1,
wherein the visual attention calculating unit generates a plurality of low-level attention maps,
wherein the image converting device further comprises an image combination unit which combines the plurality of low-level attention maps, and
wherein a visual attention map is generated by combining the plurality of low-level attention maps.

3. The image converting device of claim 2, further comprising:
an image filtering unit which filters the plurality of combined low-level attention maps.

4. The image converting device of claim 3, wherein the feature map comprises a center area and a surrounding area, and the visual attention is determined based on a difference between a histogram of the center area and a histogram of the surrounding area.

5. The image converting device of claim 3, wherein the feature map comprises a center area and a surrounding area, the surrounding area and the center area each comprise at least one unit-block, respectively, and the visual attention is determined based on a moment for luminance values of a plurality of pixels included in the unit-block.

6. The image converting device of claim 2, wherein the image expansion unit expands the combined plurality of low-level attention maps.

7. The image converting device of claim 1, further comprising:
an image filtering unit which filters the low-level attention map.

8. The image converting device of claim 7, wherein the feature map comprises a center area and a surrounding area, the surrounding area and the center area comprise at least one unit-block each, and the visual attention is determined based on a moment for luminance values of a plurality of pixels included in the at least one unit-block.

9. The image converting device of claim 1, wherein the downscaling image is an image wherein the two-dimensional image is downscaled in a horizontal direction, in a vertical direction, or in both the horizontal direction and the vertical direction.

10. The image converting device of claim 9, wherein a plurality of downscaling images are generated, and the plurality of downscaling images are processed in one frame.

11. The image converting device of claim 1, further comprising:
a parallax information generating unit which generates parallax information based on the visual attention map and the two-dimensional image; and
a three-dimensional image rendering unit which renders the three-dimensional image based on the parallax information and the two-dimensional image.

12. An image converting method comprising:
downscaling a two-dimensional image using an image converting device to generate at least one downscaling image;
extracting feature information from the downscaling image using the image converting device to generate a feature map;
generating a low-level attention map using the image converting device based on a visual attention of the feature map; and
up-scaling the low-level attention map using the image converting device,
wherein an increasing gray value is added to image data disposed on an upper portion of the low-level attention map, and 0 or a decreasing gray value is added to image data disposed on a lower portion of the low-level attention map.

13. The image converting method of claim 12,
wherein a plurality of low-level attention maps are generated,
wherein the method further comprises combining the plurality of low-level attention maps, and
wherein a visual attention map is generated from the combined plurality of low-level attention maps.

14. The image converting method of claim 13, further comprising:
filtering the combined plurality of low-level attention maps.

15. The image converting method of claim 14, wherein the feature map comprises a center area and a surrounding area, and the visual attention is determined based on a difference between a histogram of the center area and a histogram of the surrounding area.

16. The image converting method of claim 14, wherein the feature map comprises a center area and a surrounding area, the surrounding area and the center area comprise at least one unit-block, respectively, and the visual attention is determined based on a moment for luminance values of a plurality of pixels included in the at least one unit-block.

17. The image converting method of claim 12, wherein the downscaling image is an image wherein the 2D image is downscaled in a horizontal direction, in a vertical direction, or in both the horizontal and vertical direction.

18. The image converting method of claim 17, wherein a plurality of downscaling images are generated, and the plurality of downscaling images are processed in one frame.

19. The image converting method of claim 12, further comprising:
generating parallax information based on the visual attention map and the two-dimensional image; and
rendering a three-dimensional image based on the parallax information and the two-dimensional image.

20. A three-dimensional image display device comprising:
a display panel comprising a plurality of pixels; and
an image converting device which converts a two-dimensional image into a three-dimensional image,
wherein the image converting device comprises:
a downscaling unit which downscales a two-dimensional image to generate at least one downscaling image;
a feature map generating unit which extracts feature information from the downscaling image to generate a feature map;
a visual attention calculating unit which generates a low-level attention map based on visual attention of the feature map; and
an image expansion unit which up-scales the low-level attention map,
wherein an increasing gray value is added to image data disposed on an upper portion of the low-level attention map, and 0 or a decreasing gray value is added to image data disposed on a lower portion of the low-level attention map.

* * * * *